United States Patent
Palumbo et al.

(10) Patent No.: US 7,806,382 B1
(45) Date of Patent: Oct. 5, 2010

(54) CO-AXIAL SOLENOID AND PRESSURE REGULATOR FOR DIAPHRAGM VALVE

(75) Inventors: Aaron J. Palumbo, San Diego, CA (US); Satoshi Kuwahara, San Diego, CA (US); Mohammad Dairi, San Marcos, CA (US); Matthew G. Beutler, Temecula, CA (US)

(73) Assignee: Hunter Industries, Inc., San Marcos, CA (US)

( * ) Notice: Subject to any disclaimer, the term of this patent is extended or adjusted under 35 U.S.C. 154(b) by 692 days.

(21) Appl. No.: 11/751,534

(22) Filed: May 21, 2007

(51) Int. Cl.
*F16K 31/12* (2006.01)
(52) U.S. Cl. ............. 251/30.03; 251/30.01; 137/505.25
(58) Field of Classification Search ............... 251/251, 251/28, 30.01, 30.02, 30.03, 30.05; 137/505.25
See application file for complete search history.

(56) References Cited

U.S. PATENT DOCUMENTS

| | | | | |
|---|---|---|---|---|
| 3,439,895 A | * | 4/1969 | Marandi | .................. 251/30.02 |
| 4,226,259 A | * | 10/1980 | Szekely et al. | .............. 137/269 |
| 5,213,303 A | * | 5/1993 | Walker | .................... 251/30.02 |
| 5,509,448 A | * | 4/1996 | Wilson et al. | .......... 137/625.64 |
| 5,979,482 A | | 11/1999 | Scott | ........................... 137/15 |
| 2005/0189506 A1 | | 9/2005 | Lee | ......................... 251/30.01 |

* cited by examiner

*Primary Examiner*—John K Fristoe, Jr.
(74) *Attorney, Agent, or Firm*—Michael H. Jester

(57) ABSTRACT

A valve assembly comprises a diaphragm valve, a pressure regulator and a solenoid. The pressure regulator is operatively coupled to the diaphragm valve for maintaining a predetermined pressure in water exiting the diaphragm valve despite fluctuations in the pressure of water entering the diaphragm valve. The solenoid is mounted on the pressure regulator so that a plunger axis of the solenoid extends through a coil spring of the pressure regulator. The solenoid is operatively coupled to the diaphragm valve through the pressure regulator for opening and closing the diaphragm valve.

15 Claims, 10 Drawing Sheets

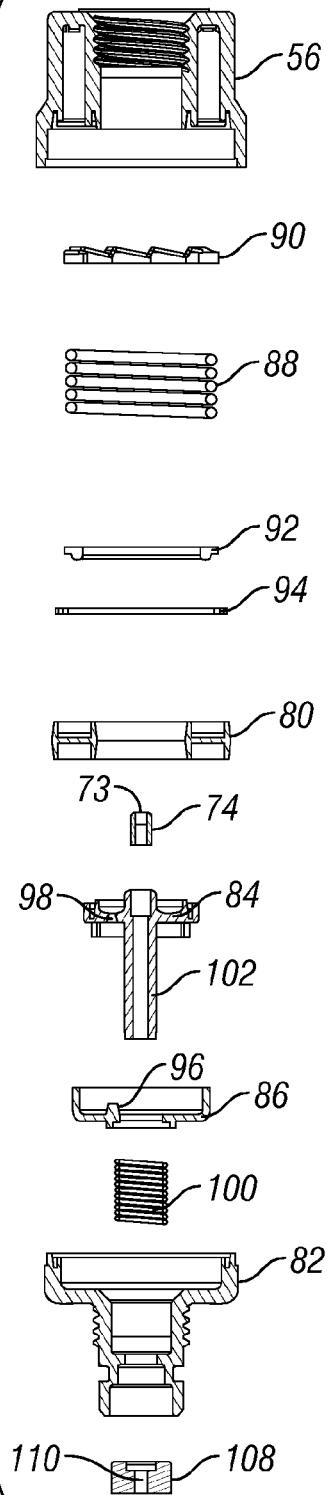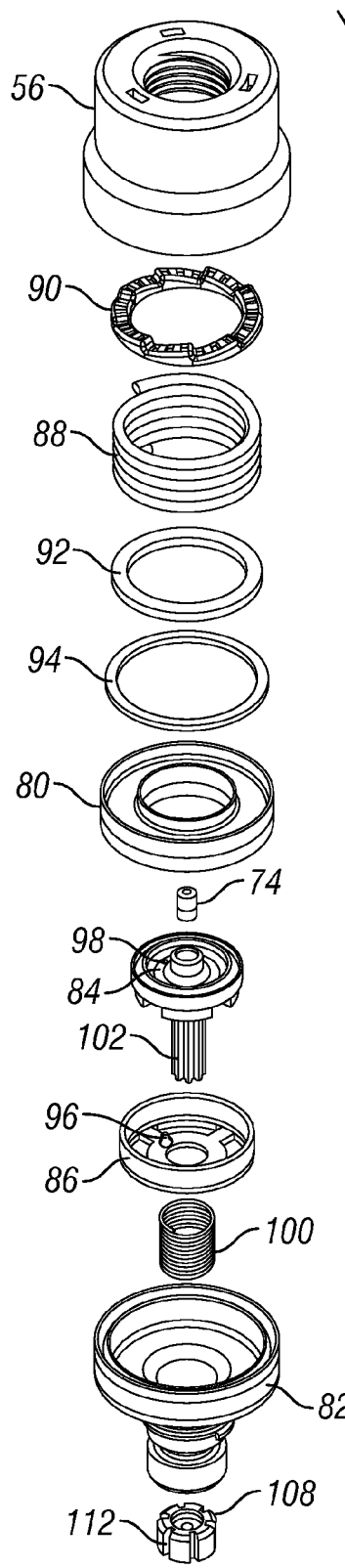

CO-AXIAL SOLENOID AND PRESSURE REGULATOR FOR DIAPHRAGM VALVE

FIELD OF THE INVENTION

The present invention relates to devices that regulate the water pressure in commercial and residential irrigation systems, and more particularly, to pressure regulators adapted for use with solenoid actuated diaphragm valves.

BACKGROUND OF THE INVENTION

Modern commercial and residential irrigation systems typically comprise an electronic irrigation controller that turns a plurality of solenoid actuated valves ON and OFF in accordance with a stored watering program. The valves deliver water through subterranean PVC pipes to a plurality of sprinklers which are typically spray or rotor-type sprinklers, although some systems use rotary sprinklers or drip applicators. The optimum performance of sprinklers in terms of delivering a desired quantity of water, e.g. measured in gallons per minute, uniformly over a desired area of coverage is dependent upon the system operating at a known water pressure. Excessive water pressure can damage sprinklers and other system components or subject them to undue wear.

Water supplied by municipal water companies or wells can have excessive pressure and/or pressure that varies throughout the day. Therefore, it has been conventional to employ pressure regulators in commercial and residential irrigation systems. The pressure regulators can be installed up stream of the valves or down stream of the valves. Sometimes pressure regulators are incorporated into the sprinklers themselves. Pressure regulators used in commercial and residential irrigation systems sometimes establish a predetermined fixed water pressure in the system. Other times the pressure regulators used in commercial and residential irrigation systems are adjustable so that the desired water pressure in the system can be set by the installer to optimize the performance of the sprinklers.

In commercial and residential irrigation systems it is sometimes desirable, from the standpoint of compactness, ease of installation, and simplicity of repair, to couple a pressure regulator directly to a solenoid actuated diaphragm valve. For a number of years, Hunter Industries, Inc., the assignee of the subject application, has sold its Accu-Set™ pressure regulator that couples to the top bonnet of its ICV™ or PGV™ diaphragm valves next to the solenoid and allows the installer to select a system pressure between twenty PSI and one hundred PSI that will be accurately maintained despite wide fluctuations in the incoming water pressure. While the Accu-Set pressure regulator has been a commercial success, it cannot be easily retrofitted to a wide variety of solenoid actuated diaphragm valves.

SUMMARY OF THE INVENTION

In accordance with one aspect of the present invention, a valve assembly comprises a diaphragm valve, a pressure regulator and a solenoid. The pressure regulator is operatively coupled to the diaphragm valve for maintaining a predetermined pressure in water exiting the diaphragm valve despite fluctuations in the pressure of water entering the diaphragm valve. The solenoid is mounted on the pressure regulator so that a plunger axis of the solenoid extends through a coil spring of the pressure regulator. The solenoid is operatively coupled to the diaphragm valve through the pressure regulator for opening and closing the diaphragm valve.

In accordance with another aspect of the present invention, a valve assembly, comprises a diaphragm valve, a pressure regulator and a solenoid. The pressure regulator is operatively coupled to the diaphragm valve for maintaining a predetermined pressure in water exiting the diaphragm valve despite fluctuations in the pressure of water entering the diaphragm valve. The solenoid is operatively coupled to the diaphragm valve through the pressure regulator for opening and closing a pilot valve. A metering orifice of the pressure regulator opens into the same control chamber as the pilot valve.

In accordance with another aspect of the present invention, a valve assembly comprises a diaphragm valve, a pressure regulator and a solenoid. The pressure regulator has a coil spring and is operatively coupled to the diaphragm valve for maintaining a predetermined pressure in water exiting the diaphragm valve despite fluctuations in the pressure of water entering the diaphragm valve. The solenoid is operatively coupled to the diaphragm valve through the pressure regulator for opening and closing a pilot valve. A metering orifice of the pressure regulator is laterally spaced from a central axis of the coil spring.

In accordance with another aspect of the present invention, a combination pressure regulator and solenoid has a coil spring in the pressure regulator and the solenoid is mounted to the pressure regulator so that a longitudinal axis of a plunger of the solenoid extends through the coil spring.

In accordance with another aspect of the present invention a pressure regulator includes a flexible diaphragm having a central opening mounted in a hollow outer body. A pilot valve member is mounted in the hollow body and defines an inlet passage leading to a pilot valve orifice. The pilot valve orifice opens into a control chamber in the hollow body through the central opening in the diaphragm. The hollow body has a portion for receiving a solenoid having a seal for opening and closing the pilot valve orifice. A pin plate is mounted in the hollow body and can reciprocate relative to the pilot valve member based on deformation of the flexible diaphragm. The reciprocation of the pin plate moves a pin on the pin plate into and out of a metering orifice in the pin plate that communicates with the control chamber. A coil spring urges the diaphragm against the pin plate. A portion of the hollow body defines an outlet passage leading from the control chamber.

BRIEF DESCRIPTION OF THE DRAWINGS

FIG. 7 is an enlarged exploded vertical sectional view illustrating the construction of the pressure regulator of the valve assembly of FIG. 3.

FIG. 8 is an enlarged exploded isometric view illustrating the construction of the pressure regulator of the valve assembly of FIG. 3.

DETAILED DESCRIPTION

Figure 2:
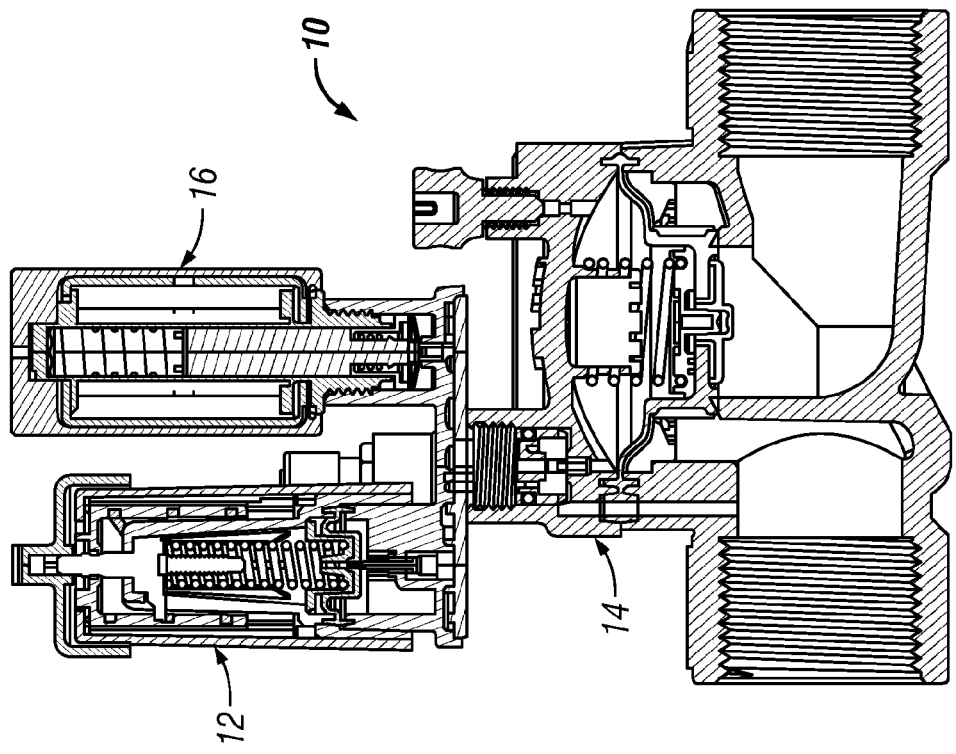
FIG. 2 is a vertical sectional view of the prior art valve assembly of FIG. 1 illustrating details of its construction.
Figure 1:
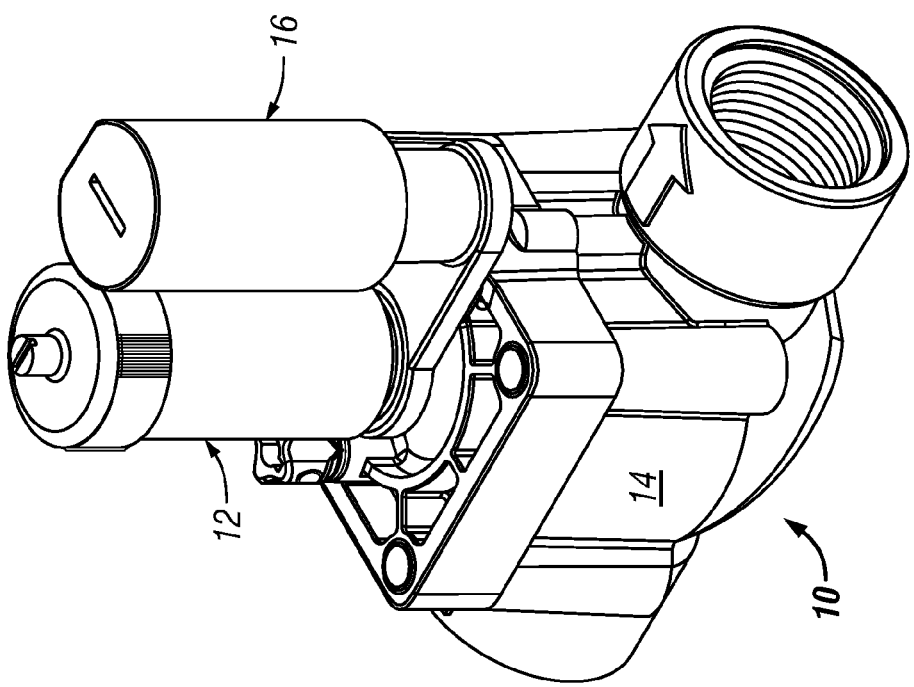
FIG. 1 is an isometric view of a prior art valve assembly including a diaphragm valve with a solenoid and pressure regulator mounted on top of the diaphragm valve in laterally spaced arrangement.

FIGS. 1 and 2 illustrate an example of a prior art valve assembly 10 that has been commercialized by Hunter Industries, Inc. An Accu-Set™ pressure regulator 12 is coupled to the top bonnet of an ICV™ diaphragm valve 14 next to a solenoid 16 that is also coupled to the top bonnet and laterally spaced from the pressure regulator 12. The valve assembly 10 can be adjusted to a predetermined system pressure of between about twenty PSI and one hundred PSI that will be accurately maintained despite fluctuations in the incoming water pressure.

Figure 4:
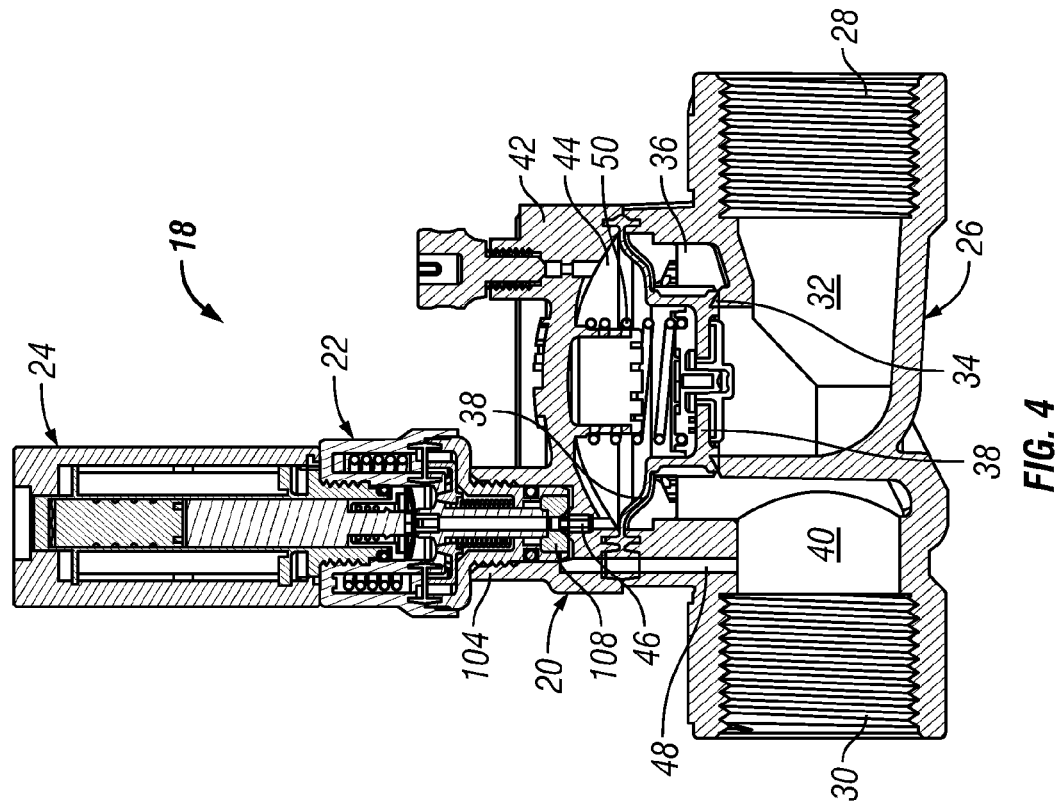
FIG. 4 is a vertical sectional view of the valve assembly of FIG. 3 illustrating details of its construction.
Figure 3:
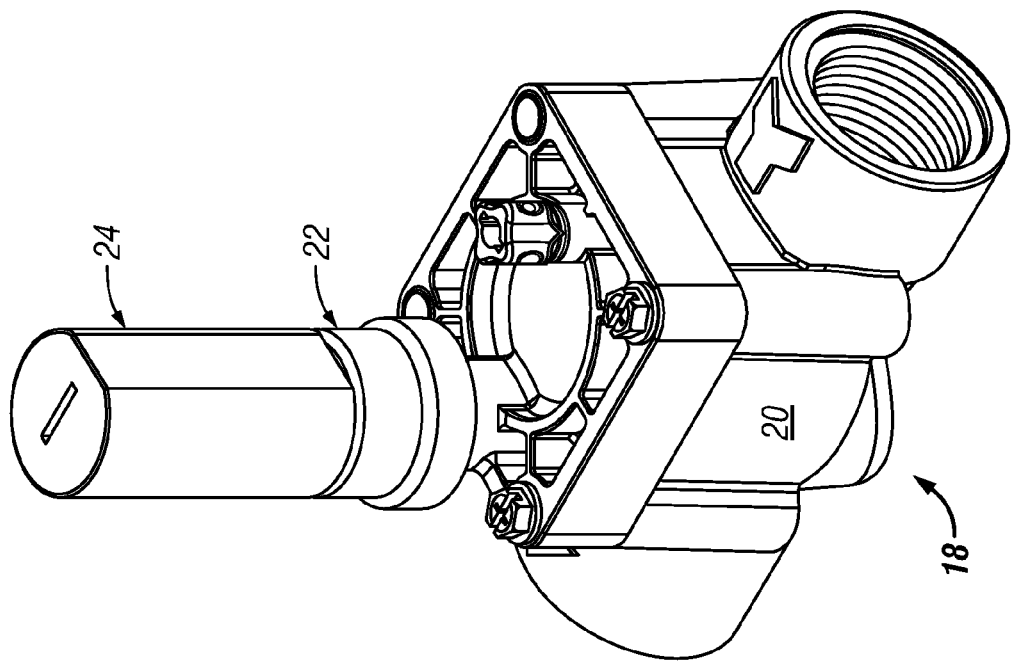
FIG. 3 is an isometric view of a valve assembly in accordance with an embodiment of the present invention including a pressure regulator mounted on top of a diaphragm valve and a solenoid mounted co-axially on top of the pressure regulator.

Referring to FIGS. 3 and 4, a valve assembly 18 in accordance with an embodiment of the present invention includes a diaphragm valve 20 with a pressure regulator 22 mounted on top of the diaphragm valve 20 and a solenoid 24 mounted co-axially on top of the pressure regulator 22. The construction of the diaphragm valve 20 is conventional and may be of the type disclosed in U.S. Pat. No. 5,979,482 of Loren W. Scott, granted Nov. 9, 1999 and assigned to Hunter Industries, Inc., the entire disclosure of which is hereby incorporated by reference.

The diaphragm valve 20 (FIG. 4) includes a housing 26 with female threaded inlet and outlet ports 28 and 30. A passage 32 in the housing 26 leads from the inlet port 28 to a circular valve seat 34 that defines an opening into a main valve chamber 36 in which a flexible diaphragm valve member 38 is located. The main valve chamber 36 communicates with a downstream passage 40 to the outlet port 30. The diaphragm valve member 38 engages and disengages the valve seat 34 to control the flow of water from the inlet port 28 to the outlet port 30. The housing 26 includes a removable top cap or bonnet 42. Pressurized water from the inlet port 28 flows via passage 32 and via a metered passageway in the center of the diaphragm valve member 38 into a pressure chamber 44 to force the diaphragm valve member 38 against the valve seat 34 to close the diaphragm valve 20. Pressurized water can be vented from the pressure chamber 44 through a pilot valve passage 46 controlled by a pilot valve that is opened and closed by the solenoid 24. The solenoid 24 can be actuated to allow water from the pilot valve to enter a relief passage 48 that leads to the downstream passage 40 and the outlet port 30. The release of water from the pressure chamber 44 enables coil spring 50 to raise the diaphragm valve member 38 upwardly off of the valve seat 34 to allow water to flow directly from the inlet port 28 to the outlet port 30 via passages 32 and 40.

As explained hereafter in detail, the pressure regulator 22 (FIGS. 3 and 4) is operatively coupled to the diaphragm valve 20 for maintaining a predetermined pressure in water exiting the outlet port 30 despite fluctuations in the pressure of water entering the inlet port 28. The co-axial arrangement of the pressure regulator 22 and solenoid 24 results in substantial savings in terms of space, weight and materials. The internal design of the pressure regulator 22 results in more reliable and accurate pressure regulation. The end-to-end combination of the pressure regulator 22 and solenoid 24 allows many pre-existing diaphragm valves to be retrofitted with a pressure regulator which could not otherwise receive the laterally spaced pressure regulator and solenoid arrangement illustrated in FIGS. 1 and 2. In addition, the valve assembly 18 of FIGS. 3 and 4 eliminates the need for an additional pressure regulation chamber and passage leading to it which are used in the prior art valve assembly 10 of FIGS. 1 and 2.

Figure 5:
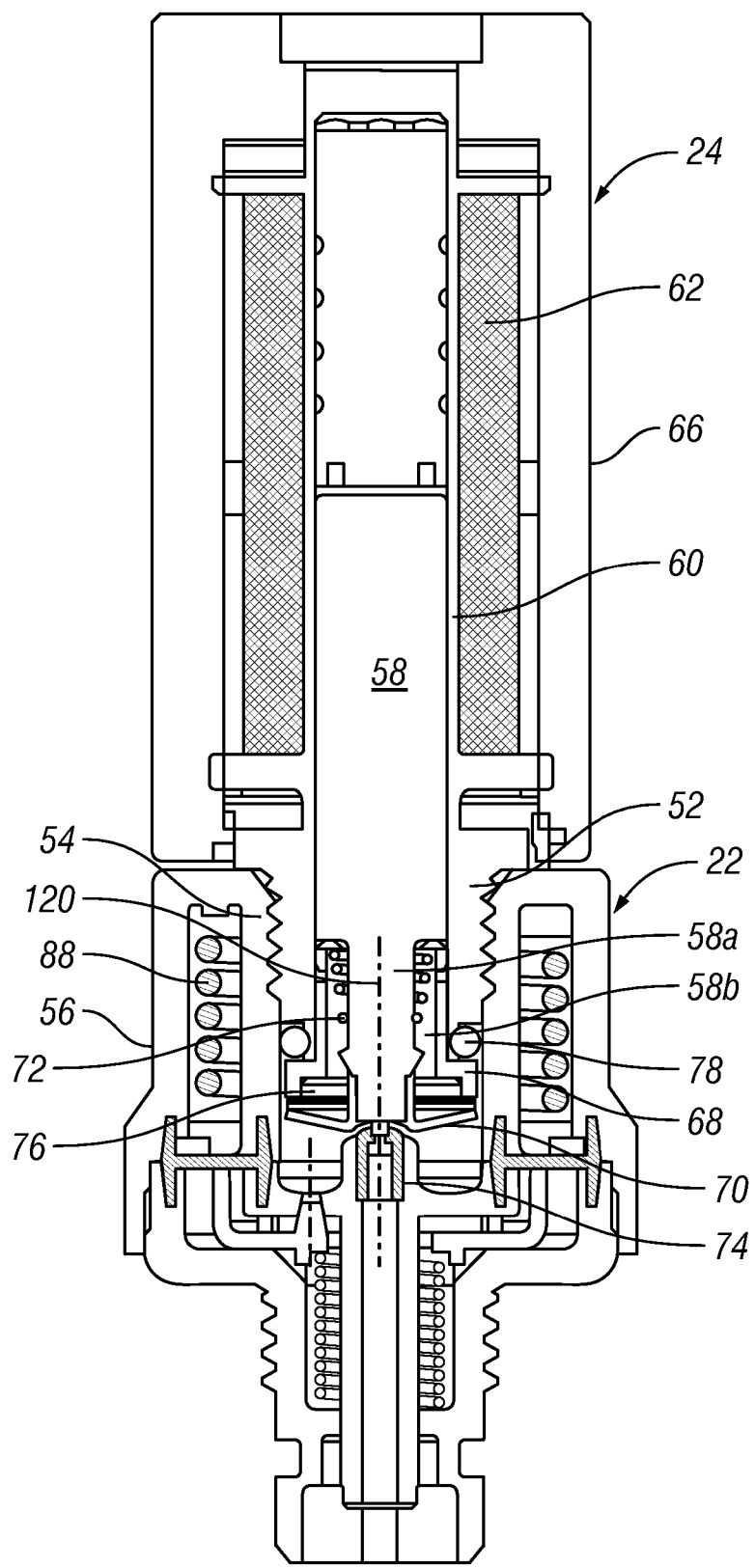
FIG. 5 is an enlarged vertical sectional view of the assembled solenoid and pressure regulator of the valve assembly of FIG. 3.

Referring to FIG. 5, the solenoid 24 has a construction similar to that disclosed in the aforementioned U.S. Pat. No. 5,979,482. The solenoid 24 has a male threaded extension 52 that is screwed into a female threaded portion 54 of the upper outer hollow body 56 of the pressure regulator 22. A cylindrical plunger 58 is mounted for reciprocal vertical motion inside a plastic spool 60 surrounded by a coil 62. A magnet 64 is mounted in a fixed position within the spool 60 above the plunger 58. The spool 60 is mounted within an outer cylindrical housing 66 which includes the male threaded extension 52. The space between the coil 62 and the housing 66 can be filled with epoxy or other suitable filler material. A cylindrical sleeve 68 fits into the lower end of the male threaded extension 52 and supports a pilot valve seal in the form of an elastomeric sealing cap 70. A coil spring 72 surrounds a reduced diameter portion 58a of the plunger and is compressed between an upper shoulder of the sleeve 68 and a shoulder 58b of the plunger 58. The coil spring 72 biases the plunger 58 to its lower position in which the sealing cap 70 seals a pilot orifice 73 (FIG. 6) in a pilot orifice forming cylinder 74. Together the pilot orifice forming cylinder 74 and sealing cap 70 form the pilot valve of the valve assembly 18. A support ring 76 is press fit into the lower end of the sleeve 68. An O-ring 78 (FIG. 5) is positioned between the sleeve 68 and the lower end of the male threaded extension 52 and engages a smooth inner wall of the upper body 56 of the pressure regulator 22 to provide a water-tight seal.

Figure 6:
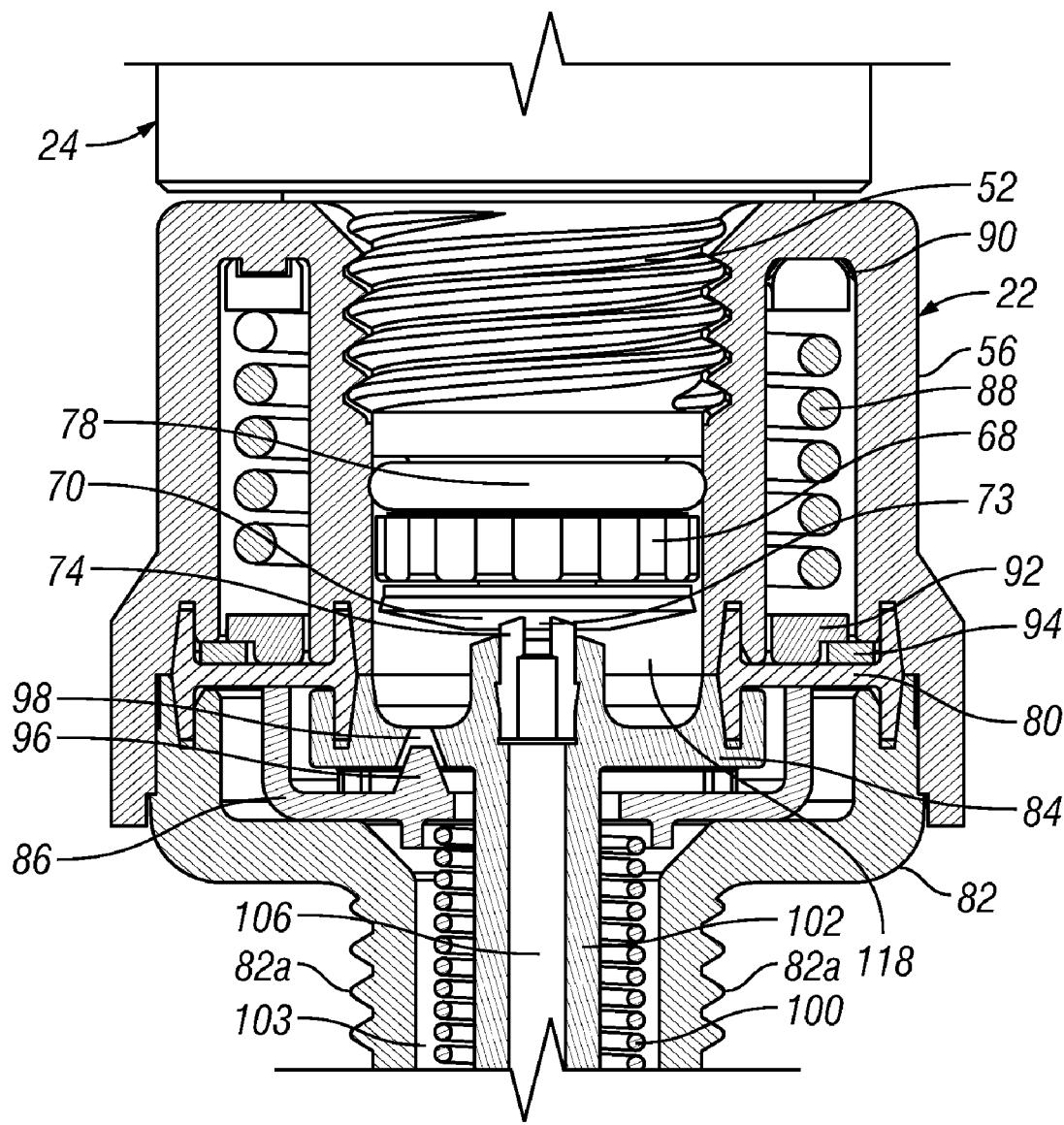
FIG. 6 is a greatly enlarged portion of FIG. 5 illustrating details of the pressure regulator of the valve assembly of FIG. 3.

Details of the pressure regulator 22 are illustrated in FIG. 6. A flexible donut-shaped elastomeric diaphragm 80 with an H-shaped peripheral cross-section is mounted in conforming recesses formed in the lower end of the upper body 56, a lower outer hollow body 82 and a central pilot valve member 84 that supports the pilot orifice forming cylinder 74. The pilot orifice forming cylinder 74 is supported in the central opening of the donut-shaped diaphragm 80. A cup-shaped pin plate 86 is centrally positioned between the lower body 82, the pilot valve member 84 and the diaphragm 80. A large main coil spring 88 is located within a cylindrical recess formed between inner and outer walls of the upper body 56. The upper end of the main coil spring 88 presses against an upper ratchet ring 90 and the lower end of the main spring 88 presses against a lower seat 92 which in turn presses against the horizontal web portion of the diaphragm 80 and a capture ring 94. The pin plate 86 can reciprocate vertically. The upper circular end of the pin plate 86 can deform the diaphragm 80 upwardly and compress the main coil spring 88. A frusto-conical pin 96 projects upwardly from one side of the pin plate 86 and can progressively obstruct a conformably shaped metering orifice 98 formed on one side of the pilot valve member 84.

The diaphragm 80 and the pin plate 86 are not rigidly attached to each other. Therefore, a small lower coil spring 100 urges the pin plate 86 upwardly into contact with the diaphragm 80. The spring 100 could be eliminated by co-molding diaphragm 80 and pin plate 86. Other means of rigidly connecting the diaphragm 80 and the pin plate 86 could be utilized such as sonic welding, adhesive attachment, or mechanical interlock. A tubular stem 102 extends downwardly from the pilot valve member 84 through a bore or central passage 103 inside the lower body 82. A male threaded segment 82a on the exterior of the lower body 82 screws into a female threaded fitting 104 (FIG. 4) formed on the bonnet 42 of the housing 26 of the diaphragm valve 20. The lower coil spring 100 (FIG. 6) surrounds the tubular stem 102 inside the bore 103. As explained hereafter in greater detail, a passage 106 in the center of the tubular stem 102 provides an inlet for water leading into the pressure regulator 22 from the pilot valve passage 46 (FIG. 4). The portion of the passage 103 (FIG. 6) between the exterior of the tubular stem 102 and the interior of the male threaded segment 82a forms an outlet for water leaving the pressure regulator 22 and communicating with the relief passage 48 (FIG. 4). A plug 108 (FIGS. 7 and 8) is positioned in the lower end of the lower body 82 and keeps the inlet and outlet passages 106 and 103 separated. The plug 108 has central hole 110 and five peripheral grooves 112 that define flow passages leading to and from the passages 106 and 103.

Figure 10:
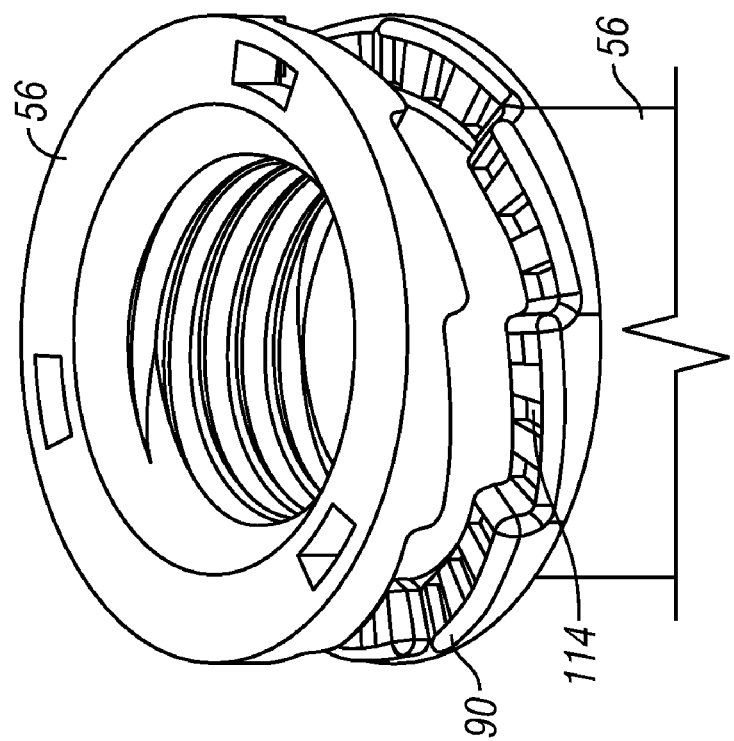
FIG. 10 is an enlarged view similar to FIG. 9 with further portions cut away.
Figure 9:
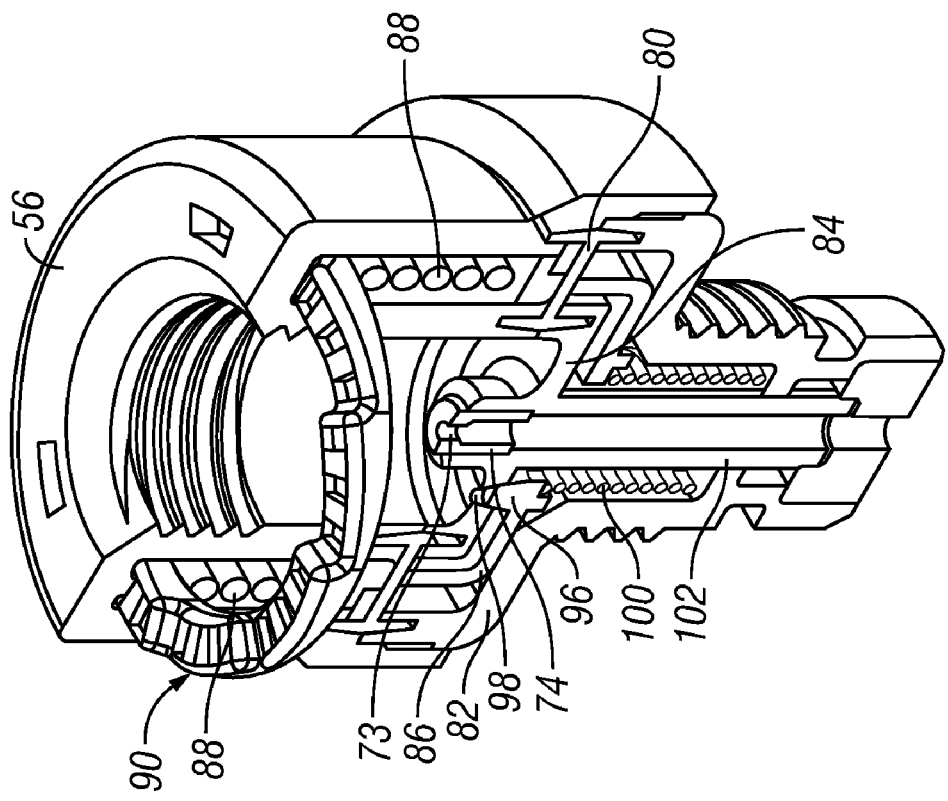
FIG. 9 is an enlarged isometric view of the pressure regulator of the valve assembly of FIG. 3 with portions cut away to illustrate the structure that allows its regulated pressure to be adjusted.
Figure 11:
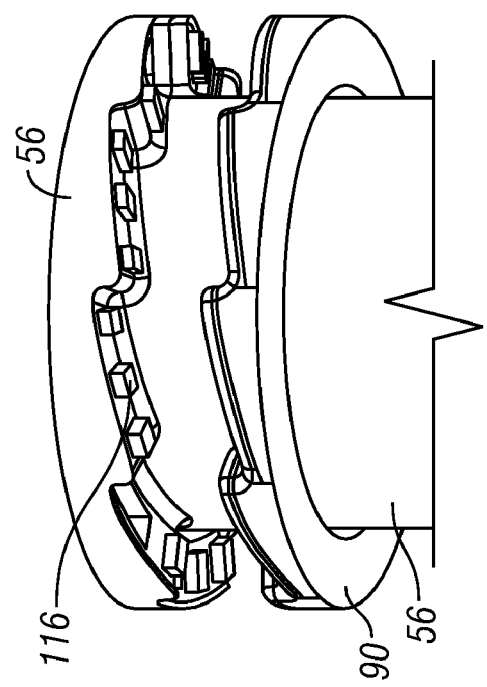
FIG. 11 is a view similar to FIG. 10 taken from below.

The pressure regulator 22 includes structure that allows its regulated pressure to be adjusted in small increments, e.g. one or two PSI. Referring to FIGS. 9-11 the upper surface of the ratchet ring 90 has a repeating pattern of inclined faces each formed with three upwardly opening rectangular recesses 114 (FIG. 10). The downwardly facing opposing interior surface of the upper body 56 has a repeating pattern of complementary inclined faces each formed with three rectangular teeth 116 (FIG. 11) that can mate with the recesses 114. When the pressure regulator 22 is assembled during manufacture, the relative rotational position of the ratchet ring 90 is set to fix the ratchet ring in one of three different heights. Each different height affects the force exerted by the main spring 88 and thus establishes a predetermined regulated pressure.

Figure 12:
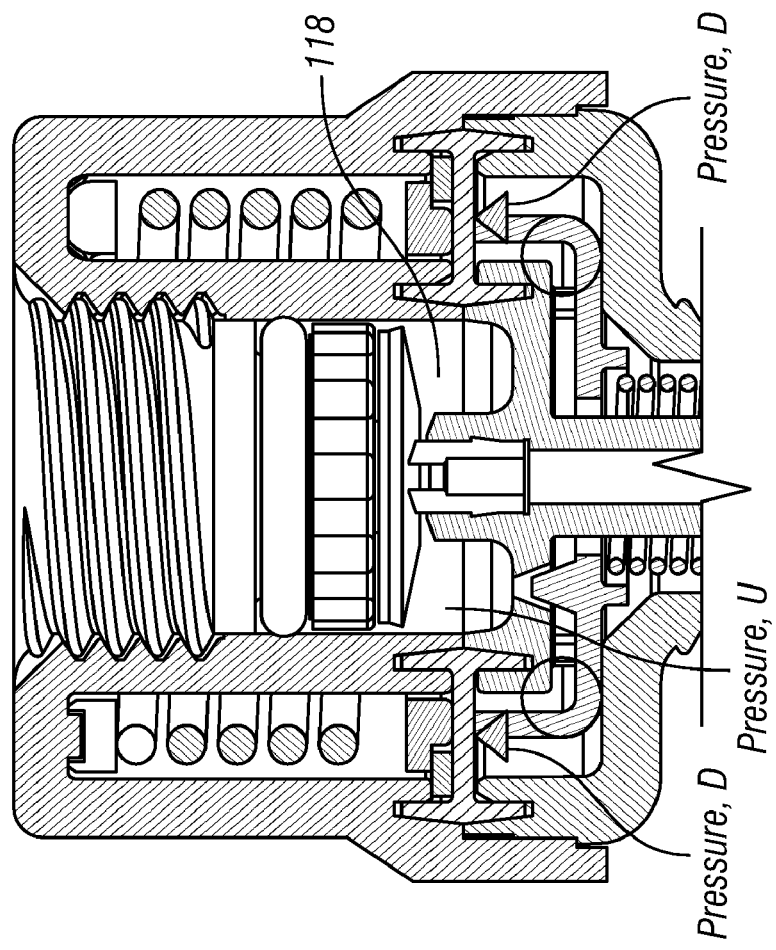
FIGS. 12-14 are a series of similar vertical sectional views of the pressure regulator of the valve assembly of FIG. 3 with diagrammatic additions to illustrate its operation.

In the valve assembly 18 (FIGS. 3 and 4) the pressure regulator 22 controls the position of the diaphragm member 38 by varying the flow of water through the pilot orifice 73. Referring to FIG. 12, when the pilot valve is open, the pressure in the inlet passage 106 and the control chamber 118 is equal to the upstream pressure, and the pressure in the passage 103 is equal to the downstream pressure. The downstream pressure exerts force on the diaphragm 80 which is counteracted by the force exerted by the large spring 88. The pin plate 86 is kept in contact with the diaphragm 80 by the small spring 100. Flow through the metering orifice 98 in the in the pilot valve member 84 is regulated by movement of the pin plate 86. The relatively large size of the spring 88 is selected and calibrated such that when the upstream pressure in the control chamber 118 equals a value U, the pin 96 will be at a vertical position X and the downstream pressure will equal a value D.

Figure 13:
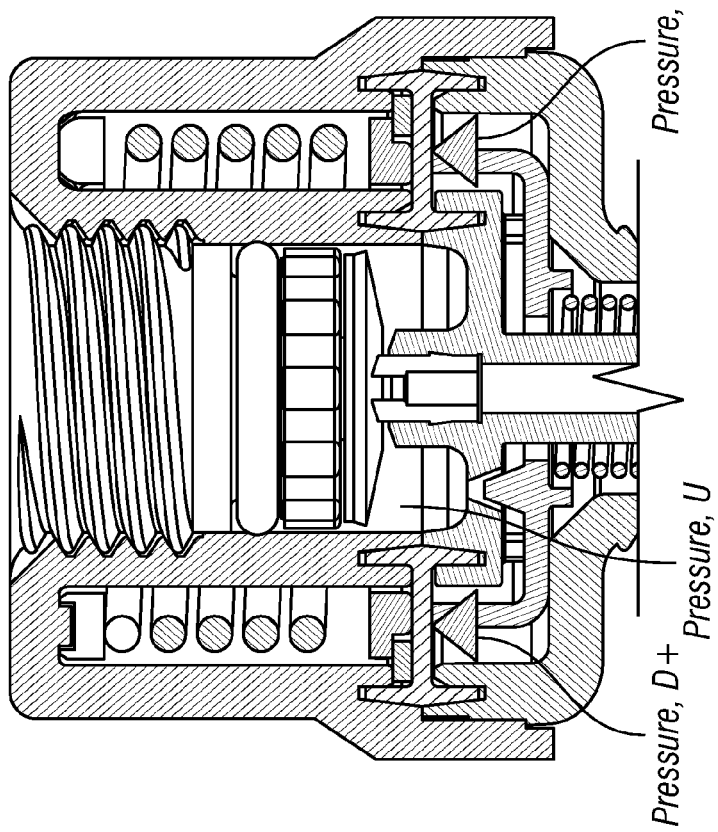

Referring to FIG. 13, if the downstream pressure begins to exceed D, more force will be placed on the diaphragm 80, which causes the large spring 100 to compress, allowing the pin 96 to move further into the metering orifice 98 in the pilot valve member 84. This chokes off the flow through the pressure regulator 22, dropping the pressure back down to D.

Figure 14:
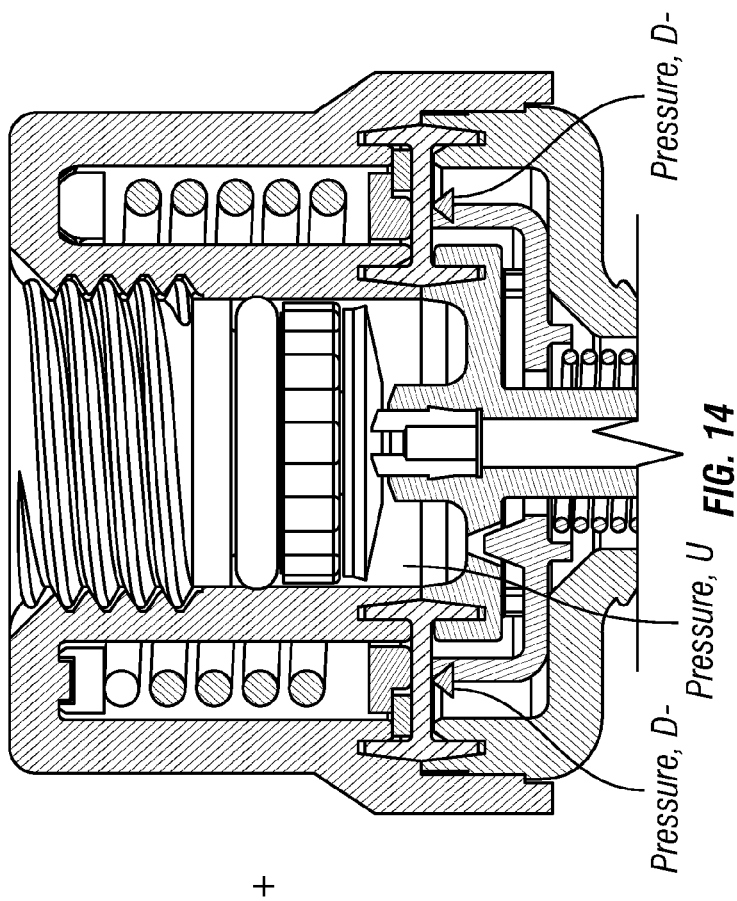

Referring to FIG. 14, if the downstream pressure begins to drop below D, less force is exerted on the diaphragm 80, allowing the large spring 100 to extend, causing the pin 96 to withdraw from the metering orifice 98 in the pilot valve member 84. This opens up the flow through the pressure regulator 22, and raises the pressure back up to D.

An important feature of the valve assembly 18 is the fact that the solenoid 24 is mounted on the pressure regulator 22 so that the central axis 120 (FIG. 5) of the plunger 58 extends through the turns of the main coil spring 88 of the pressure regulator 22. The solenoid 24 is operatively coupled to the diaphragm valve 20 through the pressure regulator 22 for opening and closing the diaphragm valve 20. In the illustrated embodiment of FIGS. 3-14 the solenoid 24 and pressure regulator are co-axial, i.e. their central vertical axes are aligned. In addition, the solenoid 24 is mounted on the pressure regulator 22 in end-to-end relation. In the valve assembly 18 the metering orifice 98 of the pressure regulator uniquely communicates with the same control chamber 118 as the pilot orifice 73 that is opened and closed by the solenoid 24. This avoids the necessity of including another regulation chamber and passageway leading to it. This configuration achieves great savings in space compared to mounting the solenoid 24 and pressure regulator 22 side by side on the valve bonnet as in the prior art valve assembly 10 of FIGS. 1 and 2. The configuration can be achieved because the metering orifice 98 (FIG. 6) of the pressure regulator 22 is asymmetrically located relative to the central axis of the coil spring 88 and diaphragm 80 and because incoming water can flow through the center of the donut-shaped diaphragm 80. The metering orifice 98 is laterally spaced from the central axis of the main spring 88. The pressure regulator 22 delivers water to the pilot valve through the center of the donut-shaped diaphragm 80. In addition, the fact that the main spring 88 of the pressure regulator 22 overlaps longitudinally or vertically with respect to the solenoid 24 achieves a savings in overall height. The small spring 100 beneficially holds the pin plate 86 against the diaphragm 80 since the latter two components are not rigidly connected. Since the force of the coil spring 88 may vary from spring to spring according to tolerance variations, the calibration feature afforded by the height adjustable ratchet ring 90 ensures that production valve assemblies can be pre-adjusted during manufacture to provide the desired regulated pressure.

Figure 16:
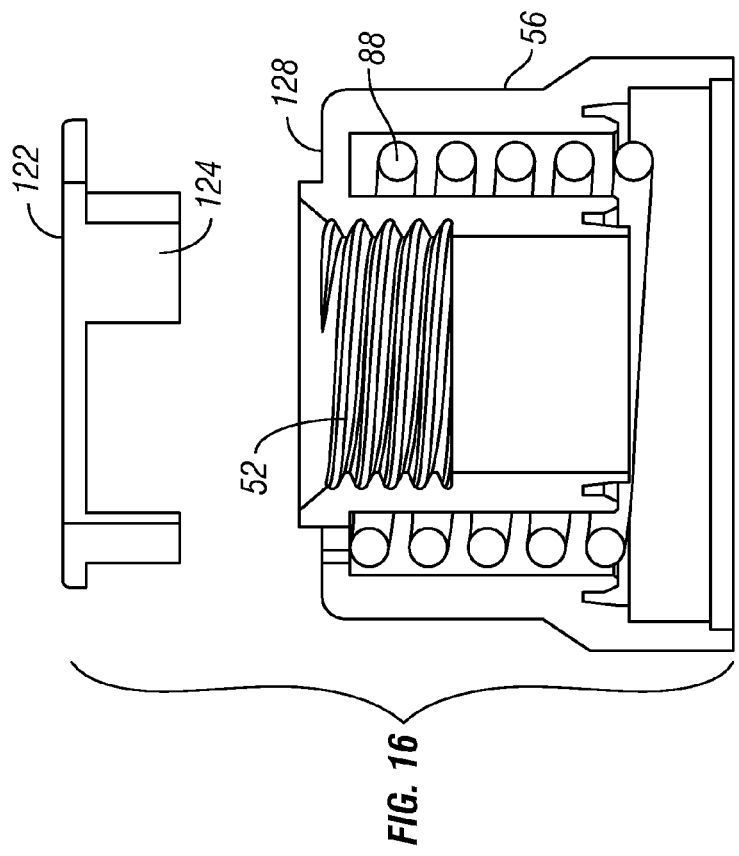
FIG. 16 is an enlarged exploded vertical sectional view of the pressure regulation ring upper valve body and main coil spring.
Figure 15:
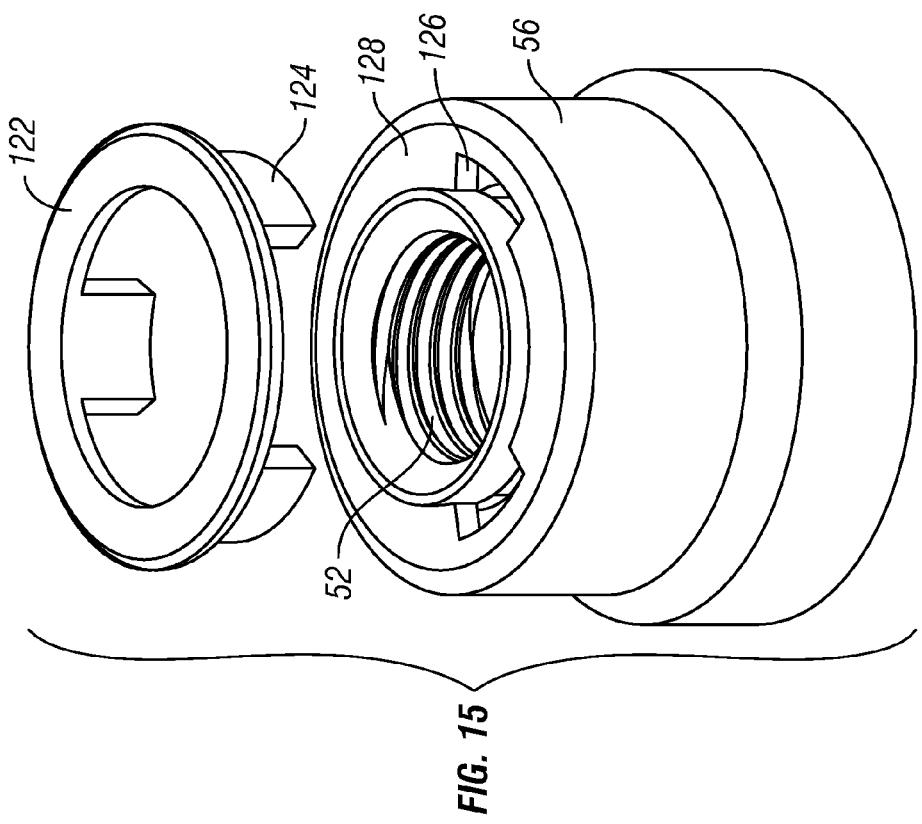
FIG. 15 is an enlarged exploded isometric view of a pressure regulation ring that may be secured to the upper body of the pressure regulator of FIGS. 6-8.
Figure 17:
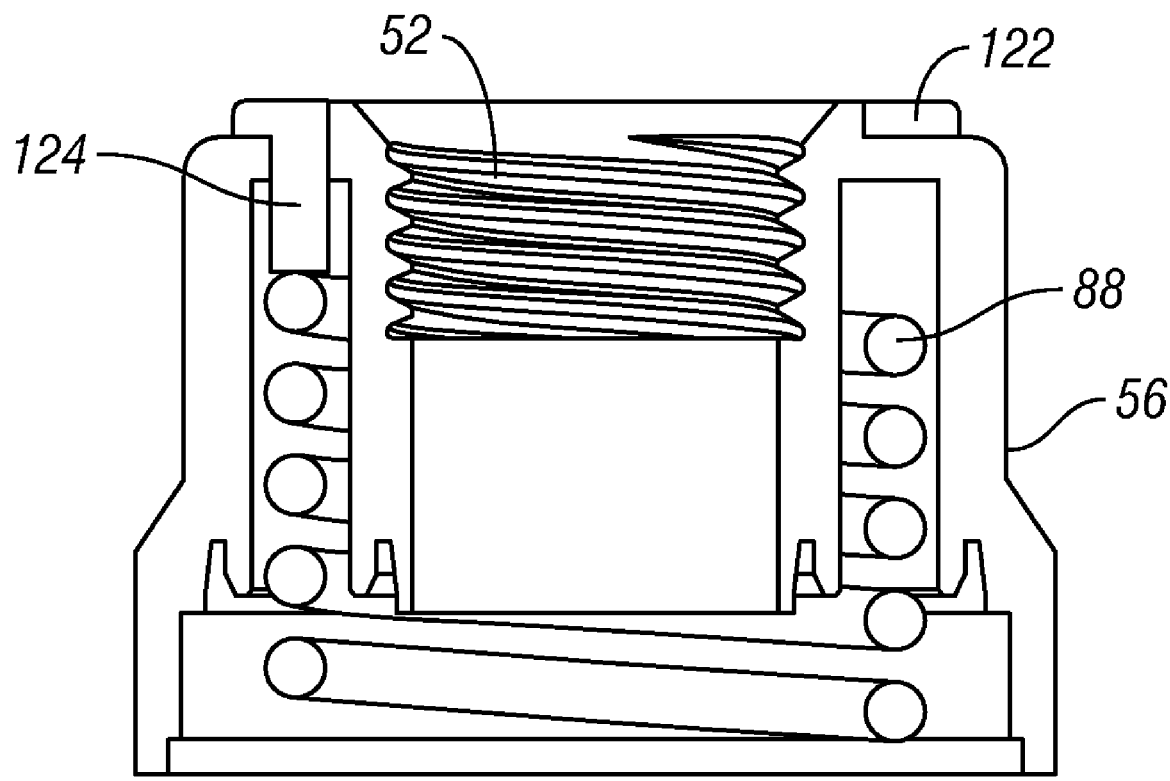
FIG. 17 is an enlarged assembled view of the pressure regulation ring, upper valve body and main coil spring.

FIGS. 15-17 illustrate a structure for allowing gross adjustments in the regulated pressure of the pressure regulator 22, e.g. increments of ten PSI, for example. The upper ratchet ring 90 is eliminated and instead, a pressure regulation ring 122 is secured to the top of the upper body 56. The pressure regulation ring 122 has three fingers 124 that extend through corresponding slots 126 in the top of the upper body. The lower ends of the fingers 124 engage the upper end of the main coil spring 88 and pre-compress the spring 88 a predetermined amount that results in the desired regulated pressure of the pressure regulator 22. The length of the fingers 124 can be varied to select the desired regulated pressure. The pressure regulation ring 122 can be secured to the top of the upper body 56 by any suitable means such as sonic welding, adhesive attachment or mechanical interlock. The upper body 56 is formed with a circular recess 128 (FIGS. 15 and 16) sized to snugly receive the pressure regulation ring 122.

While we have described embodiments of a novel pressure regulator, a combination pressure regulator and solenoid, and a valve assembly incorporating the same, it will be apparent to those skilled in the art that our invention can be modified in both arrangement and detail. Therefore the protection afforded our invention should only be limited in accordance with the following claims.

We claim:
1. A valve assembly, comprising:
  a diaphragm valve;
  a pressure regulator having a first coil spring and operatively coupled to the diaphragm valve for maintaining a predetermined pressure in water exiting the diaphragm valve despite fluctuations in the pressure of water entering the diaphragm valve; and
  a solenoid having a second coil spring and mounted on the pressure regulator so that an axis of the solenoid extends through the first coil spring of the pressure regulator, the solenoid being operatively coupled to the diaphragm valve through the pressure regulator for opening and closing the diaphragm valve.

2. The valve assembly of claim 1 wherein the solenoid is mounted on one end of the pressure regulator.

3. A valve assembly, comprising:

a diaphragm valve;

a pressure regulator having a first coil spring and operatively coupled to the diaphragm valve for maintaining a predetermined pressure in water exiting the diaphragm valve despite fluctuations in the pressure of water entering the diaphragm valve;

a solenoid having a second coil spring and operatively coupled to the diaphragm valve through the pressure regulator for opening and closing a pilot valve; and a metering orifice of the pressure regulator opening into the same control chamber as the pilot valve.

4. The valve assembly of claim 3 wherein the solenoid is mounted on one end of the pressure regulator.

5. A valve assembly, comprising:

a diaphragm valve;

a pressure regulator having a first coil spring and operatively coupled to the diaphragm valve for maintaining a predetermined pressure in water exiting the diaphragm valve despite fluctuations in the pressure of water entering the diaphragm valve;

a solenoid having a second coil spring and operatively coupled to the diaphragm valve through the pressure regulator for opening and closing a pilot valve; and a metering orifice of the pressure regulator being laterally spaced from a central axis of the coil spring.

6. The valve assembly of claim 5 wherein the solenoid is mounted on one end of the pressure regulator.

7. A valve assembly, comprising:

a main valve;

a pressure regulator having a donut-shaped diaphragm and operatively coupled to the main valve for maintaining a predetermined pressure in water exiting the main valve despite fluctuations in the pressure of water entering the main valve;

a solenoid operatively coupled to the main valve through the pressure regulator for opening and closing a pilot valve; and the pressure regulator including a passage for delivering water to the pilot valve through a central opening in the donut-shaped diaphragm.

8. The valve assembly of claim 7 wherein the solenoid is mounted on one end of the pressure regulator.

9. In combination, a diaphragm valve;

a pressure regulator operatively coupled to the diaphragm valve and having a first coil spring; and a solenoid having a second coil spring and mounted to the pressure regulator so that a longitudinal axis of a plunger of the solenoid extends through the first coil spring.

10. The combination of claim 9 wherein the pressure regulator has a metering orifice that communicates with a control chamber that also communicates with a pilot orifice opened and closed by the solenoid.

11. The combination of claim 9 wherein the pressure regulator has a metering orifice that is asymmetrically located relative to a central axis of the coil spring.

12. The combination of claim 9 wherein a central vertical axis of the solenoid is substantially co-axial with a central vertical axis of the pressure regulator.

13. The combination of claim 9 wherein the pressure regulator includes a flexible diaphragm with a central opening, a pilot valve member with a pilot orifice located in the central opening of the flexible diaphragm, and a pin plate that reciprocates relative to the pilot valve member based on deformation of the flexible diaphragm to move a pin on the pin plate into and out of a metering orifice in the pin plate.

14. The combination of claim 13 and further comprising a third coil spring that urges the pin plate toward the flexible diaphragm.

15. The combination of claim 9 wherein the pressure regulator includes a body that has a male threaded portion for screwing into the bonnet of a diaphragm valve.

* * * * *